United States Patent [19]

Higashimura

[11] Patent Number: 4,953,092
[45] Date of Patent: Aug. 28, 1990

[54] ANTI-SKID CONTROL DEVICE

[75] Inventor: Hideaki Higashimura, Itami, Japan

[73] Assignee: Sumitomo Electric Industries, Ltd., Osaka, Japan

[21] Appl. No.: 188,546

[22] Filed: Apr. 29, 1988

[30] Foreign Application Priority Data

May 1, 1987 [JP] Japan ............................. 62-109222
May 1, 1987 [JP] Japan ............................. 62-109223

[51] Int. Cl.$^5$ ........................... B60T 8/58; B60T 8/88
[52] U.S. Cl. ............................... 364/426.02; 303/100;
303/92; 180/197
[58] Field of Search ............................ 364/426.02, 550;
303/92, 106, 93, 100, 110; 180/175, 197

[56] References Cited

U.S. PATENT DOCUMENTS 4,670,852  6/1987  Masaki et al. .................. 364/426.02
4,708,406 11/1987  Takagi et al. ......................... 303/92
4,789,938 12/1988  Maehata et al. ............... 364/426.02

Primary Examiner—Parshotam S. Lall
Assistant Examiner—V. Trans
Attorney, Agent, or Firm—Cushman, Darby & Cushman

[57] ABSTRACT

An anti-skid control device comprising a stop lamp detecting unit for detecting the status of a stop lamp and for generating an ON.OFF signal, to which detecting unit is connected a determining unit for determining a control mode for a calculating and locked condition detecting unit of the anti-skid control device so that, in the event that the stop lamp detecting unit continuously generates an ON signal subsequent to the start of a process of the calculating and locked condition detecting unit, the control mode is rendered to be an OFF mode, but when and after an OFF signal has been with no doubt detected at the time of start of the process, the control mode is determined in dependence on the ON.-OFF signal.

2 Claims, 4 Drawing Sheets

ANTI-SKID CONTROL DEVICE

BACKGROUND OF THE INVENTION

1. Field of the Invention

The present invention relates to an anti-skid control device operable to effectively actuate an automobile brake system with no substantial loss resulting from slippage.

2. Description of the Prior Art

The prior art anti-skid control device makes use of a switch signal from a stop lamp switch adapted to be closed and opened selectively in dependence on a brake manipulating operation and is so designed and so configured that, when the switch signal is ON, the device can be set in a first control mode in which a locked condition of, for example, automobile wheels can be quickly detected, but when the switch signal is OFF, the device can be set in a second control mode in which the detection of the locked condition can be delayed to avoid any possible unnecessary activation of solenoid units for pressure control valves used in wheel cylinders.

However, the prior art anti-skid control device has the following problem. By way of example, in the event of the occurrence of fusion of a switch contact of the stop lamp to such an extent as to result in the continued generation of an ON signal, the anti-skid control device tends to determine that, although an automobile driver has not actually depressed a brake pedal, the brake pedal has been depressed and then resume the first mode in which the switch signal is ON. Once the anti-skid control device resumes the first control mode, the device quickly responds to even a slight change in wheel speed and, therefore, a smooth run of the vehicle tends to be hampered.

SUMMARY OF THE INVENTION

In order to substantially alleviate the above described problem, the present invention, in one aspect, provides an improved anti-skid control device having a stop lamp detecting means for detecting the status of a stop lamp and for generating an ON·OFF signal, to which detecting means is connected a determining means for determining a control mode for a calculating and locked condition detecting means of the anti-skid control device so that, in the event that the stop lamp detecting means continuously generates an ON signal subsequent to the start of a process of the calculating and locked condition detecting means, the control mode is rendered to be an OFF mode, but when and after an OFF signal has been with no doubt detected at the time of start of the process, the control mode is determined in dependence on the ON·OFF signal.

The fact that the ON signal is continuously generated from the stop lamp detecting means from the beginning of the initial process of the anti-skid control device as hereinbefore described indicates that an abnormal condition such as fusion appears to have resulted in the stop lamp switch, and accordingly, in such case, it is desirable for the anti-skid control device to operate in a mode as if the stop lamp switch were to be OFF, that is, in a mode in which the anti-skid control device slowly respond to even a slight change in wheel speed. On the other hand, once the OFF signal is generated for a certain period of time, the stop lamp switch can be regarded as having no abnormal condition and, therefore, it is desirable that the control mode can be determined in dependence on a detection signal of the stop lamp switch.

In another aspect of the present invention, there is provided an improved anti-skid control device having a stop lamp detecting means for detecting the status of a stop lamp and for generating an ON·OFF signal, to which detecting means is connected a determining means for determining a control mode for a calculating and locked condition detecting means of the anti-skid control device so that, when it has been actually detected that the stop lamp switch is OFF, subsequent to the start of a process of the calculating and locked condition detecting means, the control mode for the calculating and locked condition detecting means is determined in dependence on the ON·OFF signal of the stop lamp detecting means if an anti-skid control is being performed, time of start of the process, the control mode is determined, but the determination of the control mode in dependence on the ON·OFF signal of the stop lamp detecting means is interrupted and an OFF control mode is established if the anti-skid control is not performed and the vehicle is held still.

Once the OFF signal is generated from the stop lamp switch for a certain period of time, the stop lamp switch can be regarded as having no abnormal condition. Therefore, in such case, it is recommended to determine the control mode for the calculating and locked condition detecting means in dependence on a detection signal of the stop lamp switch. However, if the anti-skid control is not being performed and the vehicle is held still, not running, it is recommended to set the OFF control mode regardless of the detection signal of the stop lamp switch.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Figure 1:
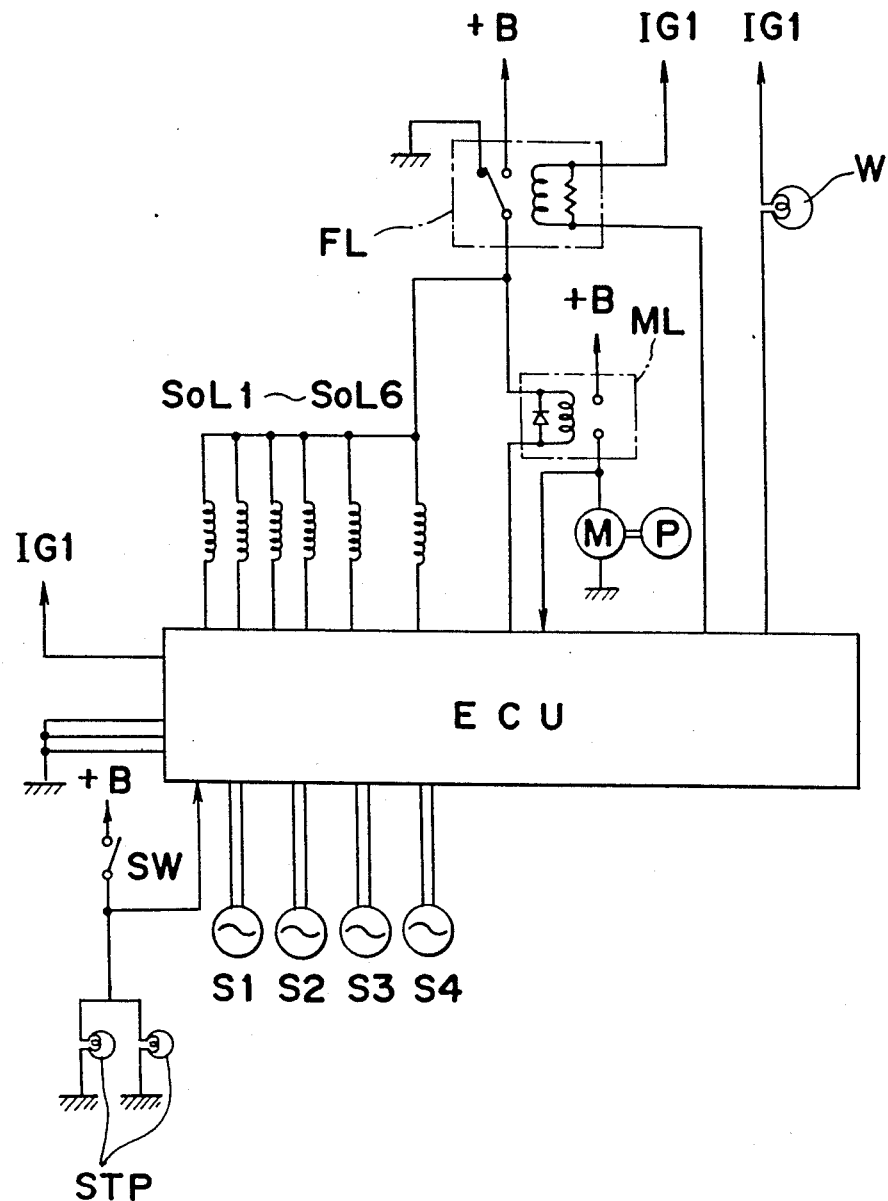
FIG. 1 is an electric circuit diagram showing an anti-skid control device according to the present invention.

Referring first to FIG. 1, there is shown an electric circuit of an anti-skid control device embodying the present invention. The illustrated circuit includes a plurality of, for example, four, wheel speed sensors S1, S2, S3 and S4 which feed respective output signals to an electronic control unit ECU. The electronic control unit ECU is so designed and so structured as to perform various calculations and determination, as to drive solenoid units SoL1, SoL2, SoL3 and SoL4 for respective pressure control valves (not shown) of associated wheel cylinders used to actuate wheel brakes and as to selectively open and close a relay unit ML for a drive motor M used to drive a pump P of a hydraulic unit (not shown), thereby to increase, retain or decrease pressures applied to the wheel cylinders.

More specifically, when a monitor circuit built in the electronic control unit ECU detects the occurrence of an abormal condition, a warning lamp W is lit and a fail-safe relay FL is opened to release a control of the anti-skid control device thereby to permit a braking operation to be accomplished manually.

The electronic control unit ECU is electrically coupled with stop lamps STP so that signals from the stop lamps STP can be supplied thereto, which signals are logically processed in a manner a will be described later.

In FIG. 1, reference character +B represents a connection to a source of electric power, reference character IG1 represents a connection to a well-known ignition switch. A switch SW on the line leading to the source of electric power +B is of a type adapted to be selectively opened and closed in response to the operation of the brake pedal.

Figure 2:
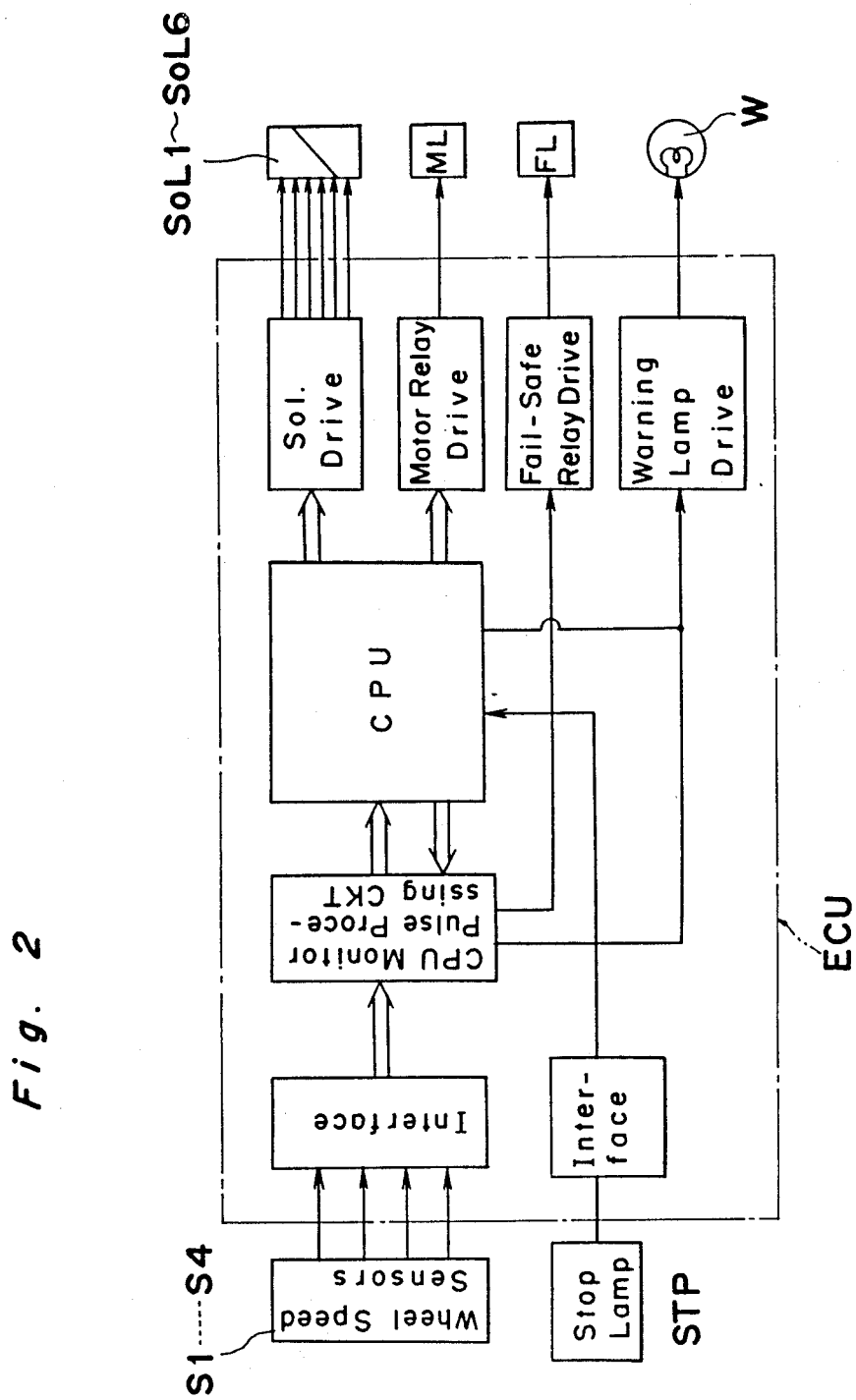
FIG. 2 is a circuit block diagram of an electronic control unit shown in FIG. 1.

Referring now to FIG. 2 illustrating the details of the electronic control unit ECU, the latter has an interface circuit for converting an analog voltage signal, supplied from each of the wheel speed sensors S1 to S4, into a pulse signal which is in turn processed by a pulse processing circuit. The pulse processing circuit counts the number of pulses fed from the interface circuit, the resultant count being then calculated, analyzed and discriminated by a program loaded in a central processing unit CPU which, based on the result thereof, provides commands to a solenoid drive circuit and a motor relay drive circuit so that the solenoid units SoL1 to SoL4 for the pressure control valves and the motor relay ML can be driven.

On the other hand, a blinking signal from each of the stop lamps STP is digitized by an interface circuit into ON·OFF signal which is in turn supplied to the central processing unit CPU so that, in accordance with the program loaded in the central processing unit CPU, a predetermined mode can be given to a processing program for the wheel speeds.

Figure 3:
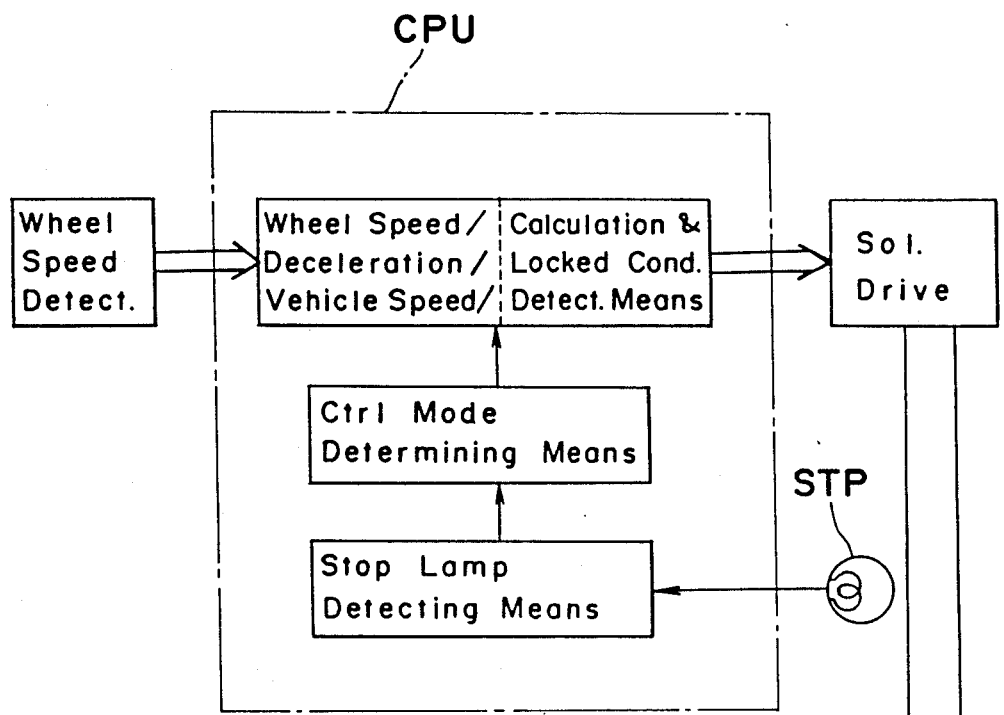
FIG. 3 is a schematic diagram illustrating the electronic control unit coupled with an automobile brake control circuit.
Figure 3:
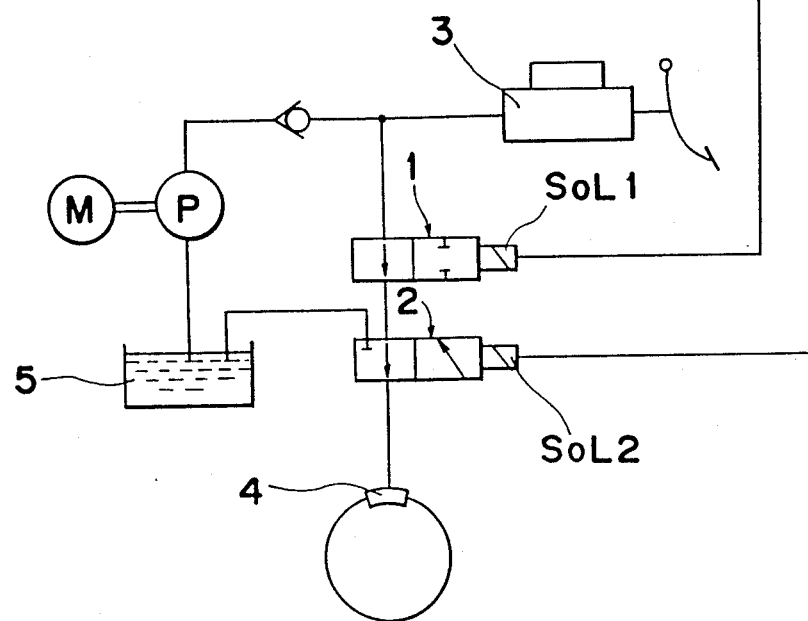

More specifically, as shown in FIG. 3, the degree of deceleration and a suspected vehicle running speed are calculated in reference to wheel speeds supplied from a wheel speed detecting means including the wheel speed sensors, the interface circuit and the pulse processing circuit, and a locked condition detecting means compares the degree of deceleration with a reference value to find if the degree of deceleration or the rate of slippage has exceeded a predetermined value, thereby to detect the tendency of the wheels being locked and then to generate a pressure reducing command to the solenoid drive circuit. In response to the pressure reducing command, the solenoid drive circuit causes the solenoid units SoL1 and SoL2 to be energized. When the solenoid units SoL1 and SoL2 are so energized, the pressure control valves 1 and 2 are displaced to the right as viewed in FIG. 3 to open a fluid circuit extending from a master cylinder 3 to a wheel cylinder 4 and to complete a fluid circuit between the wheel cylinder 4 and a reservoir 5 thereby to decrease the braking pressure applied to the brake.

When the wheel speeds start restoration and when the degree of deceleration or the rate of slippage exceeds the reference value, it is determined that the possibility of the wheels being locked has been removed and, therefore, the locked condition detecting means generates a pressure increasing command to the solenoid drive circuit. The solenoid drive circuit in response to the pressure increasing command deenergizes the solenoid units SoL1 and SoL2 to cause the pressure control valves 1 and 2 to assume the respective conditions as shown in FIG. 3, completing a fluid circuit between a source of fluid pressure and the wheel cylinder 4 to increase the braking pressure.

It may happen that, while the pressure reducing command is being generated, a pressure retaining command may be generated to supersede the pressure reducing command. This can be accomplished by energizing and deenergizing the solenoid units SoL1 and SoL2, respectively. In such event, although the pressure control valve is moved to the right as viewed in FIG. 3 to open the fluid circuit, the pressure control valve 2 is in a condition as shown and, therefore, the fluid pressure is confined in the wheel cylinder 4 with the braking pressure consequently maintained at a predetermined value.

Since the six solenoid units are shown in FIGS. 1 and 3, the above described operation is carried out for each of three channels, a first channel associated with front wheels, a second channel associated with left-hand and right-hand wheels and the last channel associated with rear wheels. However, the present invention is not always limited to such a specific example, but may be practiced for controlling the four wheels, that is, four channels.

A method for determining the occurrence of the tendency of the wheels being locked or the avoidance of the locked condition may be practiced in reference to any other index although reference has been made to the degree of deceleration or the rate of slippage.

The signal from each of the stop lamps STP is supplied by a detecting means, including the interface circuit, to the control mode determining means in the form of an ON·OFF switch signal in dependence on the selective opening and closure of the stop lamp switch. This ON·OFF switch signal is then logically processed to set a control mode of the calculating and locked condition detecting means on or off. That is to say, information necessary to change a detection level of the calculating and locked condition detecting means between high and low levels is given to the calculating and locked condition detecting means.

Figure 4:
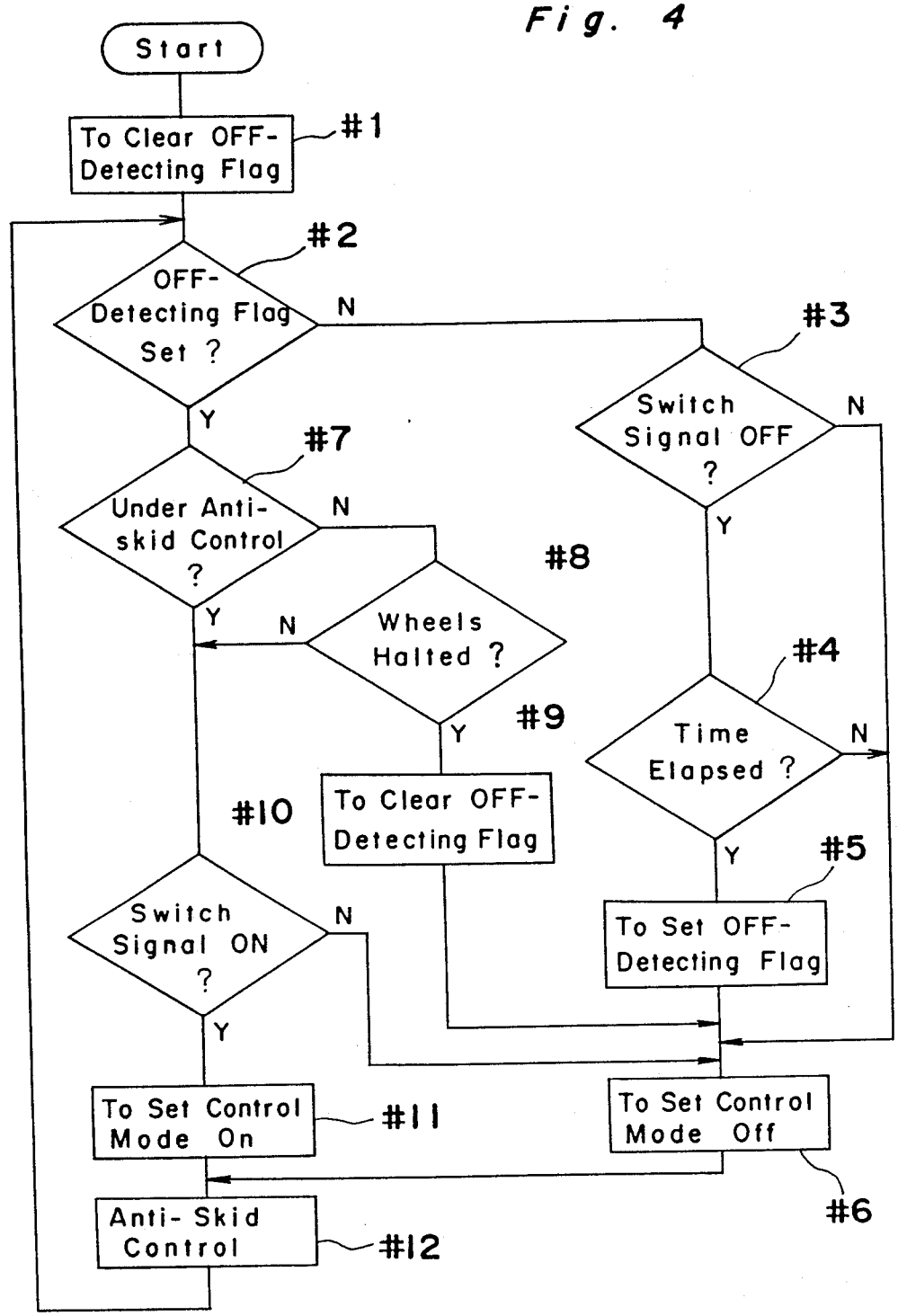
FIG. 4 is a flowchart showing the sequence of operation of a control mode determining means shown in FIG. 3.

Referring now to FIG. 4, there is shown a flow of the switch signal being processed. As shown, at the outset, a flag indicative of whether or not an OFF state of the switch signal has been detected is given. This flag is provided for informing that at the time of start of a process of the anti-skid control device the stop lamp switch is with no doubt switched off, that is, the stop lamp switch is in a normal condition.

At step #1, an OFF detecting flag is cleared, followed by a decision at step #2 to determine if the OFF detecting flag has been set. Since as a matter of fact the OFF detecting flag has not been set, the step #2 is followed by step #3 at which a decision is made to determine if the switch signal supplied from the stop lamp detecting means is in an OFF state. If the result of decision at step #4 indicates "No", a control mode of an anti-skid control (calculating and locked condition detecting means) is set off a step #6.

On the other hand, if the result of decision at step #3 indicates "Yes", a decision is made at step #4 to determine if the OFF state of the switch signal has continued for a predetermined time. This is for the purpose of ascertaining that the switch is with no doubt switched off without being adversely affected by noises such as, for example, chattering of such switch.

Should the result of decision at step #3 indicates "No", this means that the switch signal is in an ON state and, therefore, the step #3 is followed by step #6.

Should the result of decision at step #4 indicates "Yes", this means that the OFF state of the switch signal has been detected and, therefore, the OFF detecting flag is set at step #5 and the program flow return to step #2 through step #6.

Where the OFF detecting flag has been set as a result of process through steps #3, #4 and #5, a condition required for the result of decision at step #2 to indicate "Yes" is established. This means that the program determines that no abnormal condition occur in the stop lamp switch.

Therefore, at step #7, a decision is made to determine if the anti-skid control is being performed. This is necessitated to determine the necessity of the OFF detecting flag to be set. If the result of decision at step #7 indicates "No", step #8 takes place to determine if the vehicle is held still, that is, is not running. If the vehicle is held still, the OFF detecting flag is cleared at step #9, followed by step #6 at which the control mode is set off in readiness for the subsequent start. On the other hand if the vehicle is running as determined at step #8, and even though the anti-skid control is not performed, the control mode can be set either on (step #11) or off (step #6) depending on the state of the switch signal as determined at step #10.

Where the result of decision at step #7 indicates that the anti-skid control is being performed, that is, "Yes", the control mode is set either on or off depending on the result of decision at step #10.

As can be understood from the processing flow of FIG. 4, if the switch signal is in the ON state from the beginning, the flow jumps from steps #2 and #3 to step #6 with the control mode maintained as set off.

Thus, it has now become clear that, even though the stop lamp switch remains closed as a result of fusion, it is not considered that the stop lamp switch has been closed and, by rendering the anti-skid control mode to be as if the switch were turned off, an erroneous control which would occur when the brake is deemed depressed although not actually depressed can be avoided. Also, before the start of the anti-skid control, the decision is made that the switch is with no doubt turned off, and the anti-skid control is carried out under a control mode corresponding to the ON-OFF state of a normal switch. By this control, any possible generation of the erroneous decision can be avoided and, also, if the vehicle is held still while the anti-skid control is not performed, the OFF control mode is established and, therefore, unnecessary generation of the anti-skid control can be avoided.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An anti-skid control device for use with at least one vehicle wheel which is capable of locking in response to an applied braking pressure, comprising:

means for detecting a speed of the at least one vehicle wheel and for providing a wheel speed signal indicative of the speed of the vehicle wheel;

locked condition detecting means for (1) determining, in response to the wheel speed signal, whether the wheel is locked or whether the wheel is in a normal operating condition and for (2) generating an output signal to reduce the applied braking pressure, to retain the braking pressure or to increase the braking pressure in response to said determination, said locked condition detecting means having an ON status control mode and an OFF status control mode;

a hydraulic braking circuit including a pressure control valve having a solenoid unit;

solenoid drive means operable in response to the output signal from the locked condition detecting means to drive the solenoid unit in the pressure control valve;

a stop lamp switch for generating an ON/OFF signal;

stop lamp detecting means for detecting the ON/OFF signal of the stop lamp switch and for controlling the ON/OFF status control mode of the locked condition detecting means, whereby, if the stop lamp detecting means detects an OFF signal for a predetermined time, the locked condition detecting means operates in the ON/OFF status control mode in dependence upon the ON/OFF signal, but if the stop lamp detecting means does not detect the OFF signal during the predetermined time, the locked condition detecting means operates in the OFF status control mode.

2. An anti-skid control device for use with a vehicle having at least one vehicle wheel which is capable of locking in response to an applied braking pressure, the vehicle capable of standing or moving, the anti-skid control device comprising:

means for detecting a speed of the at least one vehicle wheel and for providing a wheel speed signal indicative of the speed of the vehicle wheel;

locked condition detecting means for (1) determining, in response to the wheel speed signal, whether the wheel is locked or whether the wheel is in a normal operating condition and for (2) generating an output signal to reduce the applied braking pressure, to retain the braking pressure or to increase the braking pressure in response to said determination, said locked condition detecting means having an ON status control mode and an OFF status control mode;

a hydraulic braking circuit including a pressure control valve having a solenoid unit;

solenoid drive means operable in response to the output signal from the locked condition detecting means to drive the solenoid unit in the pressure control valve;

a stop lamp switch for generating an ON/OFF signal;

stop lamp detecting means for detecting the ON/OFF signal of the stop lamp switch, for detecting when the vehicle is moving, and for controlling the ON/OFF status control mode of the locked condition detecting means, whereby, if the stop lamp detecting means detects an OFF signal for a predetermined time after the vehicle commences moving, the locked condition detecting means operates in the ON/OFF status control mode in dependence upon the ON/OFF signal, except when the locked condition detecting means detects the OFF status control mode while the vehicle is standing in which case the locked condition detecting means interrupts said dependence of the ON/OFF signal and the locked condition detecting means operates in the OFF status control mode, but, if the stop lamp detecting means does not detect the OFF signal during the predetermined time after the vehicle commences moving, the locked condition detecting means operates in the OFF status control mode.

* * * * *